US008026946B2

(12) United States Patent
Nassimi

(10) Patent No.: US 8,026,946 B2
(45) Date of Patent: Sep. 27, 2011

(54) GATE ACCESS SYSTEM WITH VISITOR IMAGING AND MEMORY

(75) Inventor: Shary Nassimi, Malibu, CA (US)

(73) Assignee: The Chamberlain Group, Inc., Elmhurst, IL (US)

(*) Notice: Subject to any disclaimer, the term of this patent is extended or adjusted under 35 U.S.C. 154(b) by 1461 days.

(21) Appl. No.: 11/306,644

(22) Filed: Jan. 5, 2006

(65) Prior Publication Data

US 2008/0204559 A1 Aug. 28, 2008

(51) Int. Cl.
*H04N 7/18* (2006.01)
*G08B 29/00* (2006.01)

(52) U.S. Cl. .......................................... 348/156; 340/5.7

(58) Field of Classification Search .................. 348/156, 348/E7.089; 340/5.7
See application file for complete search history.

(56) References Cited

U.S. PATENT DOCUMENTS

| 6,535,243 | B1* | 3/2003 | Tullis | 348/14.02 |
| 2001/0001561 | A1* | 5/2001 | Coles | 348/158 |
| 2002/0099945 | A1* | 7/2002 | McLintock et al. | 713/186 |
| 2002/0183031 | A1* | 12/2002 | Yamagishi | 455/277.2 |
| 2003/0095185 | A1* | 5/2003 | Naifeh | 348/156 |
| 2004/0095254 | A1* | 5/2004 | Maruszczak | 340/692 |
| 2004/0243812 | A1* | 12/2004 | Yui et al. | 713/182 |
| 2005/0007451 | A1* | 1/2005 | Chiang | 348/143 |
| 2006/0015398 | A1* | 1/2006 | Weik | 340/933 |
| 2006/0082454 | A1* | 4/2006 | Fukuda et al. | 340/531 |
| 2006/0156361 | A1* | 7/2006 | Wang et al. | 348/156 |

* cited by examiner

*Primary Examiner* — Jason Whipkey
(74) *Attorney, Agent, or Firm* — Fitch Even Tabin & Flannery

(57) ABSTRACT

A gate access system is described where the system includes an imaging system configured to capture an image of an object disposed in a predetermined field of view in response to an image capture signal. The imaging system is also configured to associate time/date data with the image. The time/date data represents a time and a date when the image was captured. At least one gate access panel device is disposed in the field of view and coupled to the imaging system. The at least one gate access panel device is configured to transmit the image capture signal in response to being actuated. A gate transceiver is coupled to the imaging system. The transceiver is configured to transmit the image and the time/date data via a wireless communication channel.

64 Claims, 6 Drawing Sheets

GATE ACCESS SYSTEM WITH VISITOR IMAGING AND MEMORY

BACKGROUND OF THE INVENTION

1. Field of the Invention

The present invention relates generally to security systems, and particularly to security gates having an intercom.

2. Technical Background

Security gates are used to control the ingress and egress to residential areas, individual residences, corporate and institutional areas, military bases, and other such controlled areas. Security gates may be operated in a variety of ways. However, the present invention is directed to gate systems that employ a gate intercom for user access. In other words, a visitor to a controlled area speaks to a person inside the controlled space before being allowed to enter. Once permission is granted, a gate opening signal is generated. Gate closure may be effected after a predetermined time delay, or in response to a gate closure signal. The gate closure signal may be generated using any suitable manner.

As noted above, gate systems typically require that a person inside the controlled area be notified when a visitor seeks access to the controlled area. The person is typically notified by a communication channel that includes an electrically wired propagation path, for example, from a gate intercom to an intercom device disposed in the controlled area. The intercom inside the controlled space is typically a component of a communication and control system that provides the user with the ability to receive calls from the gate intercom, speak with the visitor, and control the gate from inside the controlled space.

In one approach that has been considered, wiring is disposed between the gate intercom and an interface to the home telephony wiring. The intercom wiring may be connected to an interface allowing the user to communicate with the gate intercom via the telephone. One drawback to this approach relates to the expense and, in some cases, the difficulty of placing the wiring between the gate and the controlled area.

Thus, in another approach that has been considered, a radio system is employed to link the gate intercom with the controlled area. However, this approach also has drawbacks in that each side of the radio link must employ a radio transceiver. As such, the controlled area must be equipped with both a telephone set for normal telecommunications activity, and a radio transceiver to communicate with the gate intercom.

Security systems often include one or more networked cameras. A program running on a host computer may sequentially poll each camera and display that camera's images in a corresponding window on the display. All of the digital photographs are taken in response to the host computer polling activities and stored sequentially. However, this system has drawbacks in that many of the photographs in the sequence are useless and may not represent visitor activity.

Accordingly, what is needed is a security system that includes a gate access system that captures the image of visitors in response to an actuation of one or more gate access panel inputs. The security system also needs a base station that is configured to receive and store the images along with a time/date stamp for easy retrieval.

SUMMARY OF THE INVENTION

The present invention addresses the needs described above by providing a security system that captures the image of visitors in response to an actuation of one or more gate access panel inputs and stores the images along with a time/date stamp for easy retrieval.

One aspect of the present invention is directed to a gate access system that includes an imaging system configured to capture an image of an object disposed in a predetermined field of view in response to an image capture signal. The imaging system is also configured to associate time/date data with the image. The time/date data represents a time and a date when the image was captured. At least one gate access panel device is disposed in the field of view and coupled to the imaging system. The at least one gate access panel device is configured to transmit the image capture signal in response to being actuated. A gate transceiver is coupled to the imaging system. The transceiver is configured to transmit the image and the time/date data via a wireless communication channel.

In another aspect, the present invention is directed to a security system that includes a gate access system and a base station system. The gate access system includes an imaging system configured to capture an image of a predetermined field of view in response to an image capture signal. The imaging system also is configured to generate time/date data representing a time and a date when the image was captured. At least one gate access panel device is disposed in the field of view and coupled to the imaging system. The at least one gate access panel device is configured to transmit the image capture signal in response to being actuated. A gate system transceiver is coupled to the imaging system. The transceiver is configured to transmit the image and the time/date data via at least one wireless communication channel. The base station system includes a base station transceiver configured to receive the image and the time/date data via the at least one wireless communication channel. A memory system is coupled to the base station transceiver and configured to store the time/date data and the image. A display system is coupled to the memory system and configured to display the image and the time/date data.

In yet another aspect, the present invention is directed to the security system described above. The system further includes at least one RF repeater having a repeater transceiver and a mode selection element configured to drive the repeater transceiver into a learn mode, whereby the at least one RF repeater is configured to employ the system identification key in transmissions between the gate transceiver and the repeater transceiver.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
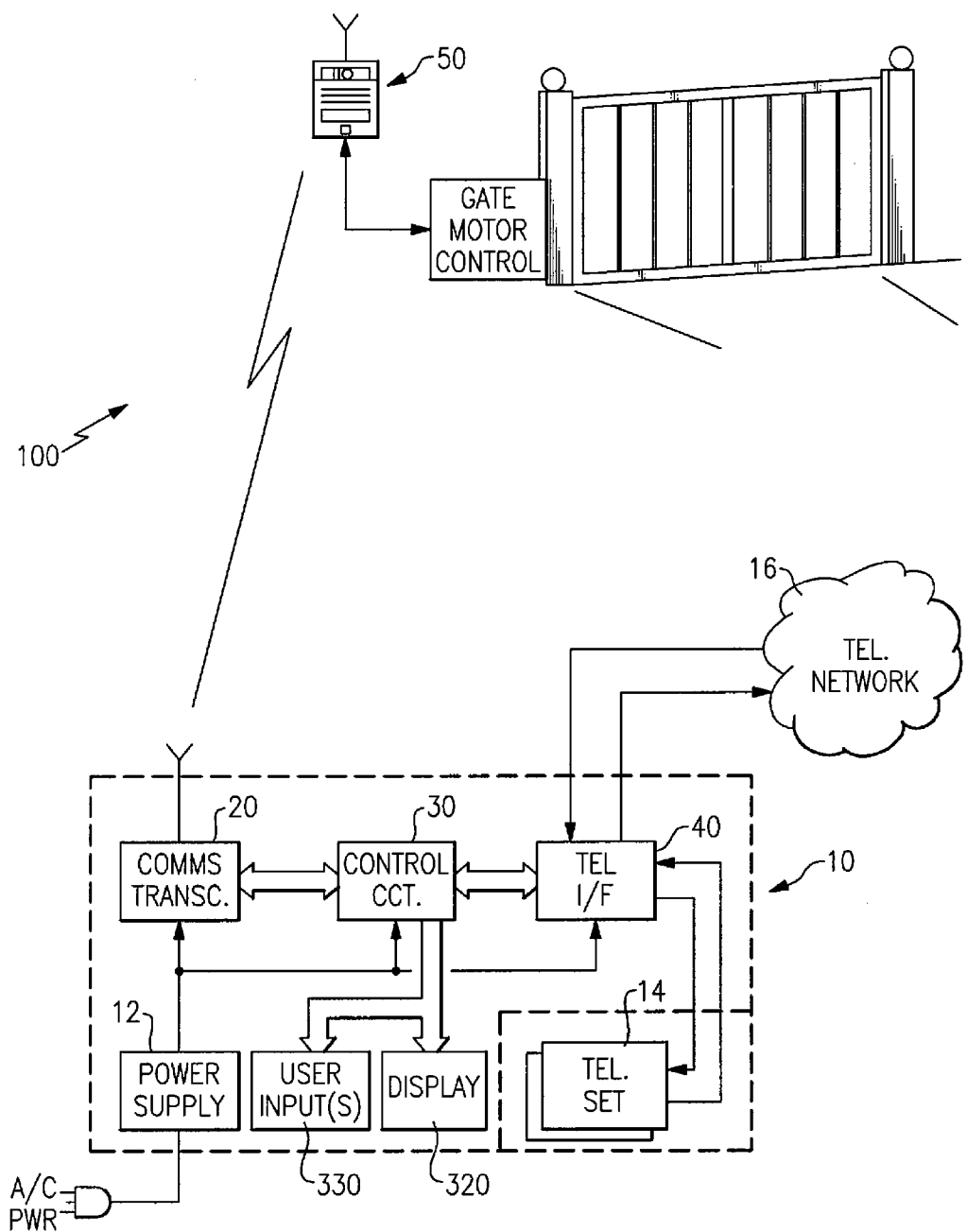
FIG. 1 is a system block diagram in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the gate security system of the present invention is shown in FIG. 1, and is designated generally throughout by reference numeral 100.

As embodied herein, and depicted in FIG. 1, a system block diagram of the gate security system 100 is depicted. Gate security system includes a base station 10 and a gate access system 50. Security system 100 includes a gate access system 50. Gate access system 50, which is explained in greater detail below, includes an imaging system configured to capture an image of a visitor within a predetermined field of view. The digital photograph is taken in response to an image capture signal generated by a gate access input device when actuated by the visitor. The gate access system 50 is also configured to generate a time/date stamp when the image is captured. Gate access system 50 is disposed within a gate access panel that includes one or more gate access input devices, such as a call button or a key device that, as noted above, transmit the image capture signal to the imaging device in response to being actuated. Gate system 50 also includes a gate system transceiver (not shown) that transmits the image and the time/date stamp via a wireless communication link between the gate system 50 and the base station 10.

The gate access system 50 includes a gate motor control unit that opens and closes the gate in accordance with commands received from the base station 10 or by way of one of the key access control devices disposed on the gate access panel. Visitors may also open the gate using one of the access control devices provided by system 50. Gate system 50 includes an imaging system that is configured to capture an image of an object or visitor disposed in a predetermined field of view. The imaging system is directed to take a digital image when either a call button or one of the access control devices are actuated by the visitor. The captured image is associated with the time and date the digital photograph is taken. The gate transceiver (not shown) disposed in gate access system 50 transmits the image and time/date stamp data to base station 10 for storage and display.

Base station 10 includes a communication transceiver 20 that is configured to communicate with the gate access system 50 by way of the radio/wireless link established between the base station and the gate system 50. The base station transceiver 20 is configured to receive a compressed version of the image and the corresponding time/date stamp via the wireless link. As will be described in greater detail below, transceiver 20 also accommodates the voice traffic between gate system 50 and base station 10.

The base station 10 is equipped with a control circuit 30 that is coupled to the base station transceiver 20. The control circuit 30 determines an operating mode status based on call origination data. Base station 10 operating mode status includes a telephonic communications mode and a remote system communications mode. Base station 10 also includes an interface circuit 40 that is coupled to control circuit 30 and the user telephone set 14, which is usually disposed in the controlled area. In the telephonic communications mode, interface circuit 40 enables "normal" telephone set usage, that is, it provides a telephonic connection between the telephone set and the telephony network. In an intercom communication mode, the interface circuit 40 couples the telephone set to the communication transceiver 20, such that voice intercom signals are propagated between the telephone set and the communication transceiver.

The control circuit 30 includes a memory system (not shown in FIG. 1) that is employed to store the time/date data and the image. Base station 10 also includes a display system 320 that is used by the operator to selectively display the digital photographic images obtained by system 50 along with their corresponding time/date stamps. User input device 330 allows a user to selectively retrieve an image and time/date stamp pair from memory for subsequent display via device 330. Of course, the memory may be sized to store a plurality of images along with their associated time/date stamps.

Base station 10 also includes a power supply 12 configured to provide each component (20, 30, 40) of device 10 with appropriate power signals. Power supply 12 includes an A/C power plug that is configured to be inserted into a standard receptacle. Of course, the power supply 12 may be adapted to conform to U.S., Canadian, European, or other such electrical power transmission standards.

As shown by the placement of the dotted line around the telephone set 14, base station 10 may be manufactured as an integrated unit that incorporates a telephone set therein. This embodiment eliminates any external connections between the interface 40 and the telephone set. The user merely inserts the telephonic cable into a telephone jack disposed in the device 10 housing, and inserts the plug from power supply 12 into an A/C power source, i.e., a wall receptacle.

On the other hand, those skilled in the art will understand that the present invention may be implemented to accommodate one or more telephone sets. In the alternate embodiment, base station 10 may be distributed and include more than one telephone set coupled to the integrated unit described above. In yet another alternate embodiment, base station 10 may be implemented by coupling a plurality of telephone sets to a computing device, such as a personal computer or workstation. In this case, some or all of the control circuit, display, and user input functionality may be disposed in the computing device.

Figure 2:
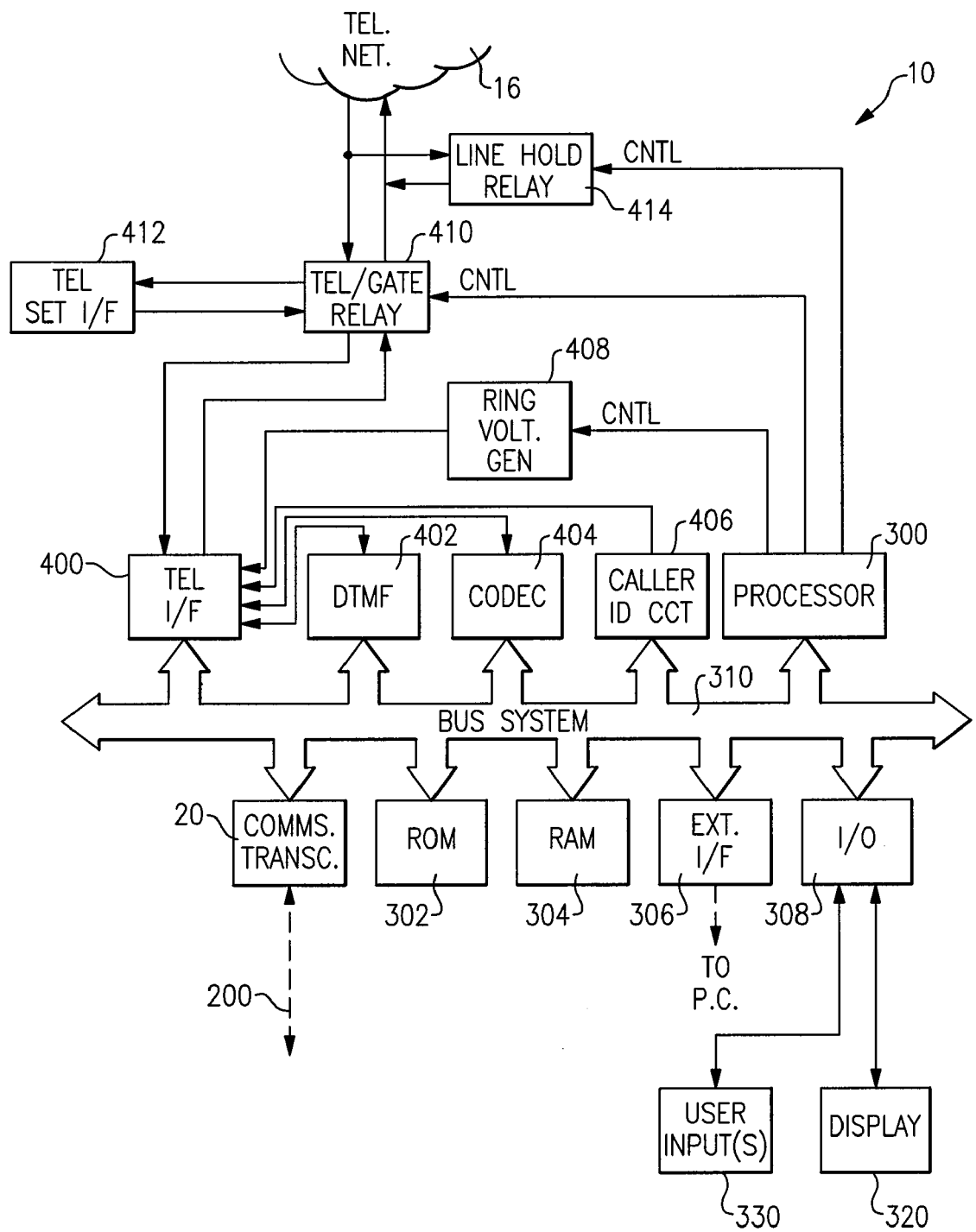
FIG. 2 is a diagrammatic depiction of the base station shown in FIG. 1.

Referring to FIG. 2, a detailed diagram of base station 10 in accordance with one embodiment of the present invention is disclosed. Base station 10 includes processor 300, read only memory (ROM) 302, random access memory (RAM) 304, external interface 306, and I/O circuit 308 coupled together by way of bus system 310. Those of ordinary skill in the art will appreciate that I/O circuit 308 is used to convert the output signals transmitted from processor 300 and bus 310 into properly formatted signals for display 320. Similarly, user input signals from device(s) 330 are converted into signals that are in accordance with bus system 310. Bus 310 also supports telephone interface circuit 400, DTMF transceiver 402, codec 404, and caller ID circuit 406. The caller ID circuit may also include a call waiting circuit incorporated therein.

Those of ordinary skill in the art will understand that telephone interface 400 provides proper impedance matching to the telephone line such that telephonic voice signals are efficiently propagated between base station 10 and the telephony network without significant losses or reflections. Telephony interface 400 may be implemented, for example, by an integrated circuit coupled to suitable isolation transformers. Interface circuit 400 is also configured to convert signals provided to the telephony network into signals having a correct format and amplitude for transmission to the public switched telephone network (PSTN) Central Office. The reverse is true as well. Telephone interface 400 may also include a buffer amplifier and an adjustable potentiometer to provide optimal signal levels.

Telephony/gate relay mechanism 410 is configured to switch between operating modes under the control of processor 300. In a telephonic communication mode, relay 410 allows voice telephony signals to propagate between the telephone set 14 and the telephony network 16. In the gate intercom communications mode, relay 410 propagates voice intercom signals between telephone set 14 and the communication transceiver 20, by way of telephony interface 400 and bus 310. Relay 410 is shown in greater detail in FIG. 3. Telephony/gate relay mechanism 410 is shown as being coupled to a telephone set interface 412.

In a wireline embodiment, interface 412 may simply represent the input jack of telephone set 14. On the other hand, the telephone set 14 disposed in base station 10 may be a wireless telephone. In this implementation, telephone set interface 412 supports the wireless telephony channel between interface 412 and the telephone set 14.

Line hold relay 414 is used to place a load on the telephone line to thereby mimic an off-hook condition. Thus, if a user inside the controlled space is on a telephone call, the remote caller may be placed on hold while the user attends to a visitor at the gate. Once the visitor is processed, the user may return to his/her conversation. Relay 414 is shown in greater detail in FIG. 4.

Those skilled in the art will also understand that DTMF (dual tone multi-frequency) transceiver 402 generates and detects audible tones associated with the telephone network. In the present invention, DTMF 402 is configured to transmit gate control commands to the gate control unit (See FIG. 1). The DTMF transceiver may also be configured to detect status information provided by the gate control unit. Further, the presence of DTMF signaling from the telephony network may be employed by processor 300, via DTMF transceiver 402, as a means for determining the operational mode of device 10. Those of ordinary skill in the art will understand that processor 300, DTMF 402, Codec 404, and CID 406 may also be configured to perform traditional telephonic call handling functions if telephone set 14 is incorporated into base station device 10.

It will be apparent to those of ordinary skill in the pertinent art that modifications and variations can be made to codec transceiver 404. For example, codec 404 may employ a standard telephonic digitization scheme to band limit voice frequencies to the 300-3300 Hz frequency band. In this implementation, codec 404 may perform an A/D conversion of an analog voice message using a μ-law companding scheme. For example, when sampling the analog waveform, larger amplitudes are compressed relative to the smaller amplitudes, providing an equivalent 12-bit accuracy within an 8-bit digital word. The 8-bit words generated by codec 404 can be stored in RAM 304, or in a memory resident in processor 300.

Those of ordinary skill in the art will recognize that Caller ID circuit 406 may be of any suitable type. For example, circuit 406 may be implemented using a single CID receiver chip. CID receiver chip 406 may be implemented as an integrated circuit that includes an A/D converter, a CID detection circuit, a gain adjusting circuit, a demodulator, and a serial-to-parallel buffer. The detection circuit in CID circuit 406 detects a channel seizure waveform signaling that a CID mark signal will follow. After synchronizing with the mark signal, CID circuit 406 receives a CID data packet that may include CID information such as telephone number, name, date, time, and error correction information if the in-coming call is from the telephony network. If the call is from the gate intercom, the CID packet data will identify the call as such. After extracting the CID data, the serial-to-parallel buffer converts the CID data into digital words suitable for transmission on system bus 310. CID 406 may also incorporate caller waiting functionality as well.

Processor 300 may be implemented using an off-the-shelf microprocessor such as a Pentium processor manufactured by Intel, a DSP manufactured by Motorola, or any suitable processing circuit depending on the sophistication of the implementation. Those of ordinary skill in the art will also recognize that processor 20 can also be implemented using application specific integrated circuits (ASIC), or a combination of off-the-shelf processors and ASICs in the design. Processor 300 is programmed to support conventional call handling functions and also determines the device operating mode status in response to CID data. As noted above, the device operating mode status includes a telephonic communications mode and a remote system communications mode. As noted above, processor 300 signals relay 410 to switch between modes.

Base station system 10 also includes a ring voltage generator 408. Generator 408 is likewise under the control of processor 300. If processor 300 determines that an incoming call is from the telephony network, a first ring voltage having a distinctive cadence is transmitted to generator 408. The ringing cadence notifies the user that the call is a normal telephone call. If processor 300 determines that the call is coming from the gate intercom a second distinctive pattern is transmitted to ring generator 408. Of course, this pattern signals the user that the call is coming from the gate.

Base station system 10 also includes read/write random access memory (RAM) 304 which is employed during data processing and data I/O functions. A programmable read only memory (ROM) 302 is also used to store programming instructions and database information used by processor 300. One of ordinary skill in the art will recognize that ROM 302 may be implemented using a DRAM, PROM, EROM, EPROM, E$^2$PROM, a hard drive, diskettes, a compact disk device, or any other suitable computer readable medium.

Base station system 10 may also include an external peripheral interface 306. Interface 306 is configured to communicate with an external computing device such as a personal computer (PC). Those of ordinary skill in the art will understand that a PC may be employed by personnel within the controlled area to control base station 10 and the gate system remotely. The PC may also be used to collect call and visitor data as needed. The PC may also be coupled to a local area network (LAN) or a wide area network (WAN).

I/O circuit 308 may be employed to support one or more data entry and display devices. Thus, caller ID information, or any of the data stored on the PC may be accessed via a display device. Similarly, system control data may be transmitted to base station 10 by way of the data entry devices. The display may be of any suitable type, such as a liquid crystal display capable of displaying CID information, dialing information, memory contents, menu information, programming instructions, or any other suitable information that can be displayed. The data entry devices may be implemented using a telephone set twelve-key dialing device, a function key set, a keyboard for data entry and programming functions, and/or a mouse. The I/O circuit may also support a speaker and a microphone. This embodiment provides a great deal of flexibility in that the personnel inside the controlled area may converse with a visitor at the gate using either the telephone set 14 or the speaker and microphone coupled to the PC/workstation.

Figure 3:
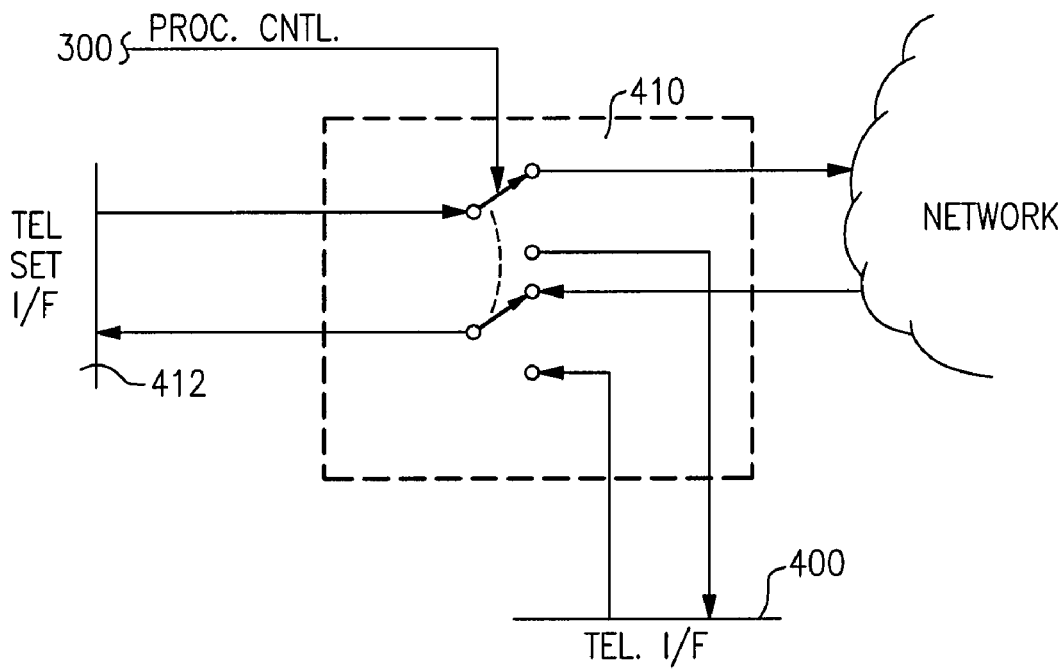
FIG. 3 is a detailed diagram of the telephone/gate mode relay depicted in FIG. 1.

As embodied herein and depicted in FIG. 3, a detailed diagram of the telephone/gate mode relay 410 is shown. In one embodiment, interface 410 is configured as a double pole, double throw (DPDT) switch. Those of ordinary skill in the art will understand that relay 410 may be implemented as a mechanical relay or as an electrical relay system. Relay 410 is normally set in the telephonic communication mode such that the telephone set 14 is coupled to the PSTN central office. Processor 300 may switch the mode to the gate intercom mode in response to a call from the gate, a telephone set keypad entry, an input from the external interface 306, or by way of any suitable call origination means.

Figure 4:
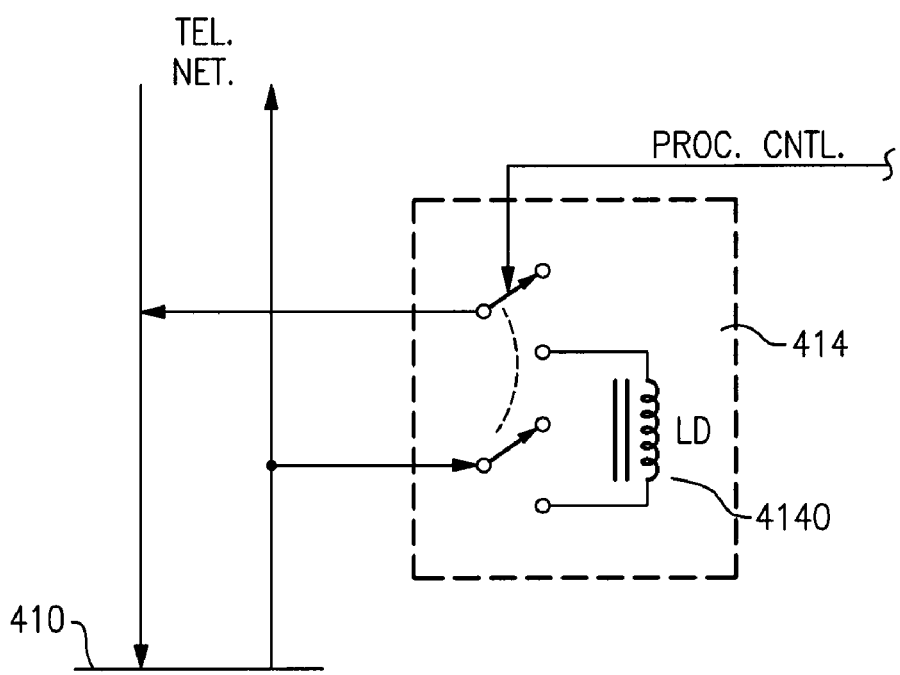
FIG. 4 is a detailed diagram of the line hold relay depicted in FIG. 1.

Referring to FIG. 4, a detailed diagram of the line hold relay 414 is shown. Line hold relay 414 may also be configured as a DPDT switch. In telephonic communication mode, relay 414 is open circuited. In gate intercom mode, processor 300 may couple the telephone line to load 4140 to simulate an off-hook condition. As described above, processor 300 transmits the switching signal when the user places a caller on hold to speak with a visitor via the gate intercom. Once the visitor is processed, the user takes the caller off hold and processor 300 removes load 4140 from the telephone line.

Figure 5:
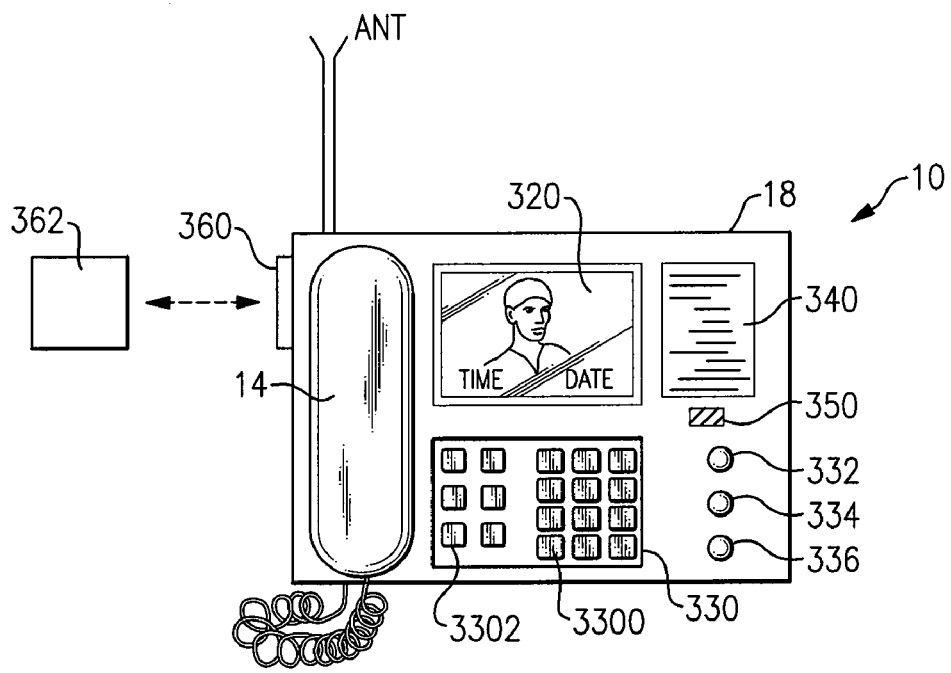
FIG. 5 is an implementation of the base station in accordance with an embodiment of the present invention.

As embodied herein and depicted in FIG. 5, an implementation of the base station 10 in accordance with an embodiment of the present invention is disclosed. In this embodiment, base station 10 is an integrated unit disposed in a single housing 18. The front portion of housing 18 includes alphanumeric keypads 3300, 3302 which are employed during the operation of telephone set 14. Disposed above the keypads is display 320 which may be used to show the user at base station 10 the image of the visitor at the gate, or a previously stored image. The time and date of the image capture is also provided. System 10 also includes an intercom speaker unit 340 as well as an intercom microphone 350. One of the keys in keypad 3302 (labeled "speaker") allows the user to use either telephone set 14 or the intercom (340, 350) unit to converse with a visitor at the gate. Base station 10 may also include user input buttons 332, 334, and 336. Button 332 may be employed, for example, to transmit a "gate open" command to the gate access system 50. Button 334 may be used to place base station 10 into "learn mode" during system configuration. Button 334 may also be employed to erase a previous pairing. The learn mode and erase mode will be discussed in more detail below. Finally, when the intercom mic/speaker combination is employed, button 336 may be depressed when the user is speaking. The transceiver electronics, of course, are disposed within housing 18 and connected to antenna ANT. Housing 18 also includes an extendible memory feature embodied by memory port 360. Memory port 360 is configured to accommodate memory card 362. Those skilled in the art will understand that the size of memory port 360 and card 362 may vary depending on the technology employed.

As noted above, display 320 and alpha-numeric keypads 3300, 3302 may be employed to scroll through a history of the visitors attempting entry at the gate. In one embodiment of the present invention, the images are photographic still images captured by the digital camera disposed in gate system 50. Each digital image includes the time and date of image capture.

Those of ordinary skill in the art will also recognize that any suitable type of removable data storage may be employed in the present invention depending on the size of the size requirements of the device 360 and desired storage capacity of computer readable media 362. Storage capacities range from 1.44 MB for a standard floppy diskette to 20 MB for some portable devices. This embodiment of the present invention, as well as the embodiment depicted in FIG. 6, may employ magnetic storage devices, optical storage devices, or solid state storage devices to implement the removable data storage feature.

As those of ordinary skill in the art will appreciate, magnetic devices may be implemented using disk devices, zip drives, cartridges, or portable drives. Optical implementations include CD-recordable and/or CD-rewritable devices. Solid state devices may include flash-memory storage devices such as Compact Flash (CF) devices, Memory Stick (MS) devices, MultiMediaCard (MMC), secure digital cards (SD), SmartMedia (SM) devices or xD devices as they are known and referred to in the art. Of course, the present invention should not be construed as being limited to the examples provided above.

In one embodiment of the present invention, a SD card is employed to implement memory 362. An SD card is about the size of a large postage stamp. SD cards have a range of storage capacities from 32 MB to 4 GB with various capacities in between. Of course, the number of images stored in a single SD card will vary based on the card capacity, the digital camera, and the size of the average image file. The file size is also a function of the camera. For example, the average file size of 2 megapixel camera may be about 900 kB. A 32 MB SD card may, therefore, hold about 35 images. A 256 MB card may store about 284 image files. A 4 GB card will store over 4,500 images. An average file size of 3 megapixel camera may be about 1.2 MB. Thus, a 32 MB card will store about 26 image files, a 256 MB card may store over 210 image files, and a 4 GB card may store over 3,400 images. Thus, as the camera resolution increases, the number of images stored in a given SD card goes down. For example, a 6 megapixel camera may have a typical file size of about 3.2 MB. Accordingly, the 32 MB SD card will be able to store 10, images, the 256 MB card will store 80 files, and the 4 GB card may accommodate over 1,200 image files.

Figure 6:
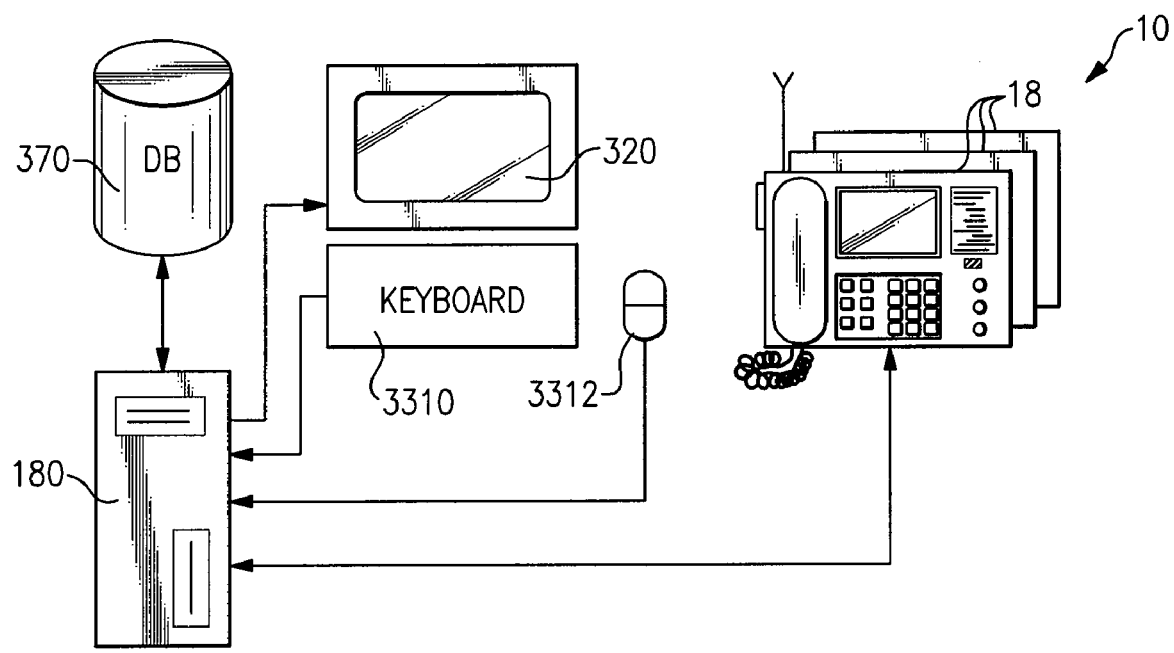
FIG. 6 is an implementation of the base station in accordance with an alternate embodiment of the present invention.

As embodied herein and depicted in FIG. 6, an implementation of the base station 10 in accordance with an alternate embodiment of the present invention is disclosed. The base station of the present invention may be implemented such that various components may be spatially distributed. This embodiment is advantageous in that several telephone set housings may be distributed throughout the residence or building as needed. The intelligence of system 10 may be distributed between the telephone set and the computer system 180.

Computer system 180 may be a personal computer or a work station that employs a suitable operating system. Computer 180 is coupled to user input devices 33310 (keyboard) and mouse 3312. In larger applications, computer system 180 may accommodate database (DB) 370. This embodiment allows a user to access a greater number of image files. Further, a relational database allows the image files to be accessed using any number of field identifiers such as visitor name, visitor association data (i.e., company, organization, etc.), as well as by the date/time data previously discussed. Further, if the visitor used one of the user-input devices disposed in the gate system 50 to gain access, database 370 may be configured to relate the image and time/date stamp to data obtained by user-input device. For example, if the visitor entered a code into a keypad, a card reader, or some other device to gain access to the gate, the base station user may retrieve that code along with the image file from database 370.

Display 320 may be implemented using any suitable device such as a cathode ray tube (CRT), liquid crystal display, active matrix display, or plasma display, for displaying information to a computer user. Keyboard 3310 may include alphanumeric and other keys for communicating data and command selections to the processor disposed in computer 180. Device 3312 represents a cursor control mechanism that may be implemented using a mouse, a trackball, or cursor direction keys. Device 3312 communicates directional information, command selections and cursor movement signals to computer 180.

The computer system 180 also includes a communication interface that provides a two-way data communication between computer 180 and telephone units 18. For example, the communication interface may be implemented using a digital network (ISDN) card, a cable modem, a telephone modem, or any other communication interface adapted to provide a data communication connection to a corresponding type of communication line. In another embodiment, the data stored in either telephony units 18 or computer 180 may be accessed remotely by user via the communication interface. Accordingly, the communication interface may be implemented using a local area network (LAN) card (e.g. for Ethernet™ or an Asynchronous Transfer Model (ATM) network) to provide a data communication connection to a compatible LAN. Wireless links may also be implemented. In any such implementation, the communication interface transmits and receives electrical, electromagnetic, or optical signals that carry digital data streams representing various types of information.

Further, the communication interface may include peripheral interface devices, such as a Universal Serial Bus (USB) interface, a PCMCIA (Personal Computer Memory Card International Association) interface, etc. Although the text refers to a single communication interface, those of ordinary skill in the art will understand that computer 180 may employ multiple communication interfaces.

Computer system 180 may employ various types of computer-readable media in performing its tasks. The term computer-readable medium as used herein refers to any medium that participates in providing data and/or instructions to the processor for execution. Common forms of computer-readable media include, for example, a RAM, a PROM, and EPROM, a FLASH-EPROM, any other memory chip. Other forms of computer readable media may include the magnetic, optical, and solid state devices described above, or any other medium from which a computer can read.

Those of ordinary skill in the art will understand that any suitable transmission media may be used to transfer data between computer 180 and telephonic devices 18. Transmission media may include copper wire, coaxial cables, and fiber optics. Transmission media can also take the form of optical or electromagnetic transmissions, such as those generated during radio frequency (RF) and infrared (IR) data communications.

Figure 7:
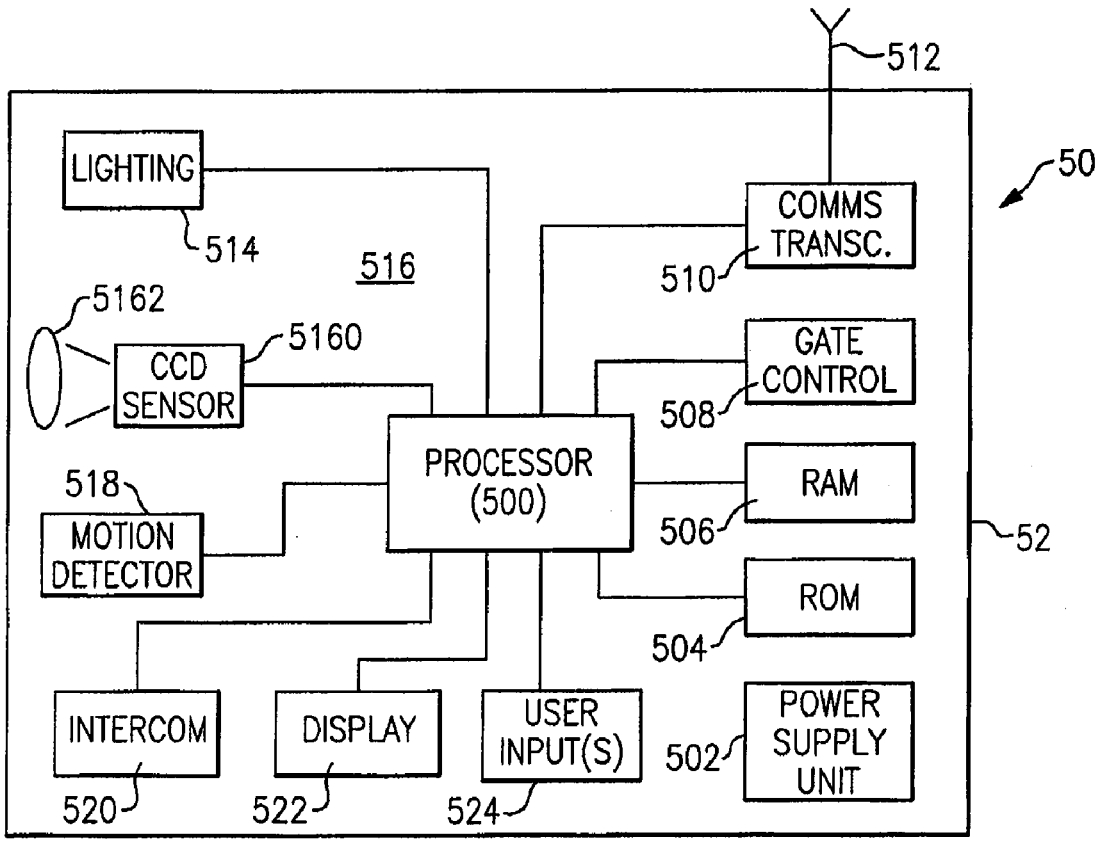
FIG. 7 is a block diagram of the gate access system shown in FIG. 1.

As embodied herein and depicted in FIG. 7, a diagrammatic depiction of the gate access system 50 shown in FIG. 1 is disclosed. System 50 includes processor 500, read only memory (ROM) 504, random access memory (RAM) 506, gate control I/O circuitry 508, gate transceiver 510, and circuitry related to digital camera 516 disposed on a printed circuit board (not shown) disposed in housing 52. Processor system 500 is also electrically coupled to intercom 520, user inputs 524 and display 522. Lighting assembly 514 is configured to illuminate the field of view under the control of processor 500. Processor 500 also controls digital camera 516, which in general, includes an imaging sensor 5160 coupled to imaging optics 5162.

A motion detector 518 may also be coupled to processor 500. The motion detector 518 provides processor 500 with an interrupt signal that prompts processor 500 to activate lighting assembly 514 in response to the movement of a person or object in the vicinity of the field of view. Motion detector 518 is an energy efficient feature that allows system 50 to enter a sleep mode when the activity in the vicinity of the gate is relatively low, such as at night.

The components disposed in housing 52 receive power from power supply unit (PSU) 502. PSU 502 converts power obtained from an AC power source (i.e., a utility) or from a battery unit, into the various voltage levels required by each of the components disposed in housing 52.

Image sensor 5160 may be of any suitable type. In the example shown in FIG. 7, the image sensor is implemented using a CCD color image sensor. However, those of ordinary skill in the art will understand that other types of imaging devices may be employed based on the cost and resolution requirements of system 50. For example, imager 5160 may also be implemented using a CMOS color imager.

Processor system 500 may be implemented in a number of different ways depending on the cost, availability, and performance of off-the-shelf processors, and the type of image sensor. In one embodiment, processor 500 may be implemented using a suitable off-the-shelf microprocessor. The microprocessor may be a general purpose device, such as a Pentium processor or the like, or the processor may be implemented using a RISC, DSP or a DSP hybrid processor. In another embodiment, processor system 500 may be implemented using a microprocessor in combination with an application specific integrated circuit (ASIC). In this embodiment, the ASIC may be implemented using a field programmable gate array device (FPGA) that is configured to control the image acquisition process and the storage of the imaging data. Accordingly, the FPGA is configured to control the various timing and control functions related to the light assembly 514, motion detector 518, image sensor 5160, and image transmission via gate transceiver 510. The general purpose microprocessor is programmed to perform the over-all control of system 50 including control of writing data to display 522, processing data received from user inputs 524, and running the operating system software.

RAM 506 is used to store the data and instructions that are executed by the processor. RAM 506 may also be used for storing temporary variables or other intermediate information during execution of instructions. Read only memory (ROM) 504 stores the embedded program/instructions executed by processor system 500. ROM may be implemented using EPROMs or $E^2$PROMs. RAM typically includes volatile memory devices, but may include non-volatile memory devices as well. Processor system memory may also employ FLASH memory.

Lighting assembly 514 includes a light source coupled to illumination optics. The illumination optics direct light from the light source toward a target area in the field of view. The illumination optics may be of any suitable type and include one or more lenses, diffusers, wedges, reflectors, or a combination of the aforementioned elements.

In operation, the image sensor 5150 converts light reflected from a visitor, i.e., the image, into electrical signals. The sensor assembly typically includes an A/D converter that converts the electrical signals into digital imaging data. The image sensor is actuated under the control of processor system 500. The imaging data may be compressed using any suitable compression standard such as JPEG. The compressed digital imaging data and the time/date data are assembled into a packet for transmission by transceiver 510 to base station 10 over the wireless communication link.

Intercom system 520 accommodates two-way voice communications between gate system 50 and base station 10. Voice communications are also transmitted over the wireless link. Intercom 520 includes a microphone 5202 (not shown) that is configured to convert sound waves into analog electrical impulses in a manner commonly known in the art. Processor system 500 digitizes the analog electrical signals for transmission to base station 10. A speaker 5200 (also not shown in FIG. 7) converts analog electrical voice signals into sound waves. The analog signals are provided by processor system 500 and represent voice signals received from base station 10 by way of transceiver 510.

Modifications and variations may be made to the RF transceiver 510 depending on the type of modulation used, the center frequency of the RF channel(s), and the intended coverage range of system 100. For example, RF transceiver 510 may employ frequency modulation (FM), amplitude modulation (AM), single-sideband AM, or any suitable modulation technique.

Those of ordinary skill in the pertinent art will also recognize that the RF signal may be broadcast at any suitable frequency open for public use and may be generally selected within a range between 30 MHz-900 MHz. Alternatively, system 100 may operate in the industrial, scientific, and medical (ISM) frequency band to avoid interference with other communications equipment. The ISM band accommodates channels in the 2.4 GHz range, as well as 900 MHz. Of course, the RF channel frequency will impact the range of the broadcast signal.

Figure 8:
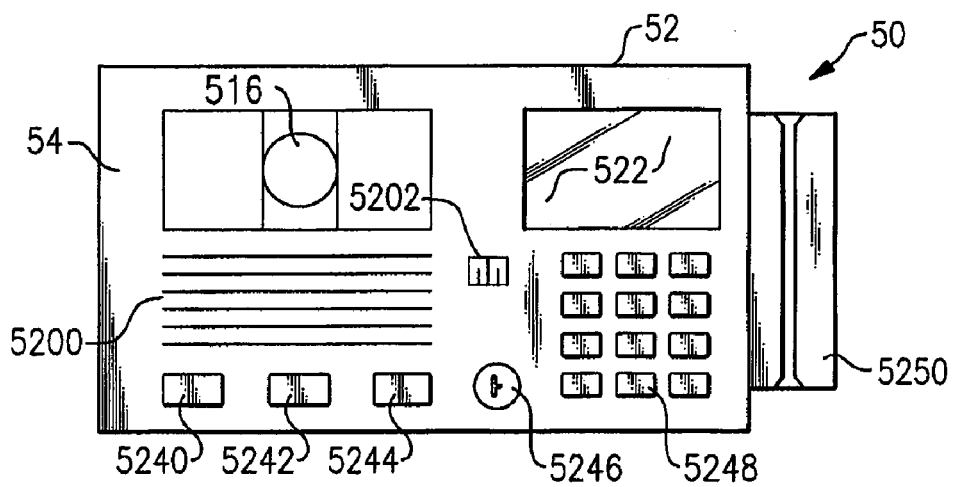
FIG. 8 is a front view of the gate access panel portion of the gate access system depicted in FIG. 7.

Referring to FIG. 8, is an example of one gate access panel form factor that may be employed by the present invention. As shown, the components described above are disposed in housing 52. The front panel 54 accommodates digital camera 516, speaker 5200, microphone 5202, display 522, and various user input devices 5240-5250.

The combination of processor 500, display 522 and the various user inputs may be configured to provide the visitor/user with a graphical user interface (GUI). The GUI may display various menu/icon options to the user. As noted above, processor 500 may selectively generate an image capture signal in response to the actuation of any of the user inputs 5240-5250. In other words, processor 500 is programmed to take a digital photograph at least once during a transaction with a visitor/user depending on the length of the transaction, and/or the time elapsed between actuation of the inputs.

User inputs include call button 5240, "talk" button 5242, "mode-select" button 5244, key lock device 5246, keypad 5248, and card reader 5250. The various input devices are self-explanatory to some extent. The visitor may open the gate if he is in possession of a key that fits key lock 5246. Alternatively, the visitor may enter an entry code using keypad 5248. In another alternative embodiment, the visitor may employ a card that is swiped through reader 5250 to gain access. In each case, the visitor's image is captured before gate control circuitry 508 transmits the necessary commands to the gate motor control unit (See FIG. 1). On the other hand, if the visitor does not have a key or a card, or does not have an entry code in his possession, the visitor presses call button 5240 and waits for a response from the base station 10. Upon depressing the call button 5240, the visitor's image is captured.

The mode select button 5244 may be actuated to alternate gate system 50 between a "teach mode" and a normal operating mode. In the teach mode, gate system 50 transmits a system identifier to other system components and, in effect, teaches the other components to initialize themselves to operate in accordance with gate system parameters. The teach/learn mode is discussed in greater detail in the text corresponding to FIG. 11.

Card reader 5250 may be implemented using any suitable device depending on system cost and complexity requirements. For example, the reader 5250 may be implemented using a magnetic card reader, an RFID reader, or any other suitable reader device. Reader 5250 may also include a device that obtains biometric data from the user.

Figure 9:
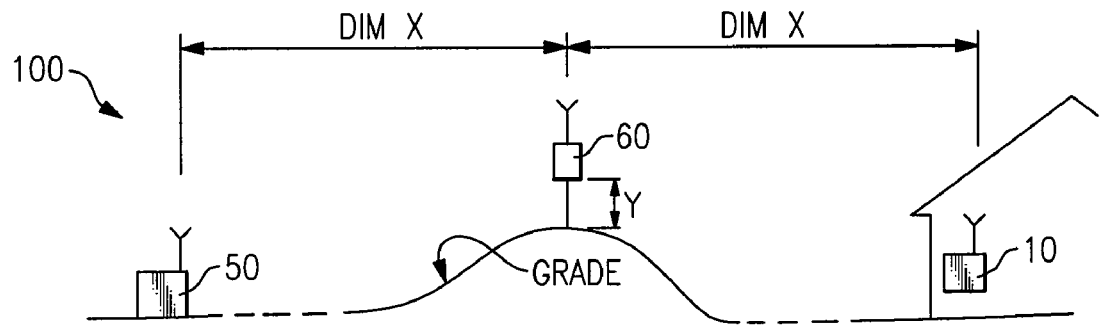
FIG. 9 is a system diagram including a repeater in accordance with another embodiment of the present invention.

Referring to FIG. 9, security system 100 may be deployed using a repeater 60. FIG. 9 is a cross-sectional view that shows a repeater disposed between gate access system 50 and base station 10. Repeater 60 is particularly useful when certain terrain features interfere with gate 50 and base station 10 communications. The repeater 60 must be disposed within a predetermined radius (DIM X) from the gate transceiver and the base station 10 transceiver to ensure reliable communications between the base station 10 and the gate system 50. Those of ordinary skill in the art will understand that the predetermined radius is a function of the RF power characteristics of the repeater transceiver. In turn, the RF power characteristics are a function of the size of the battery employed by repeater 60. The details of repeater 60 are discussed in greater detail below. However, in one embodiment of the present invention, DIM X is approximately one thousand (1,000) feet. Thus, the distance between the base station 10 and the gate 50 in FIG. 9 may be up to two-thousand (2,000) feet. Theoretically, repeater 60 may be cascaded to extend the range of system 100 indefinitely.

Figure 10:
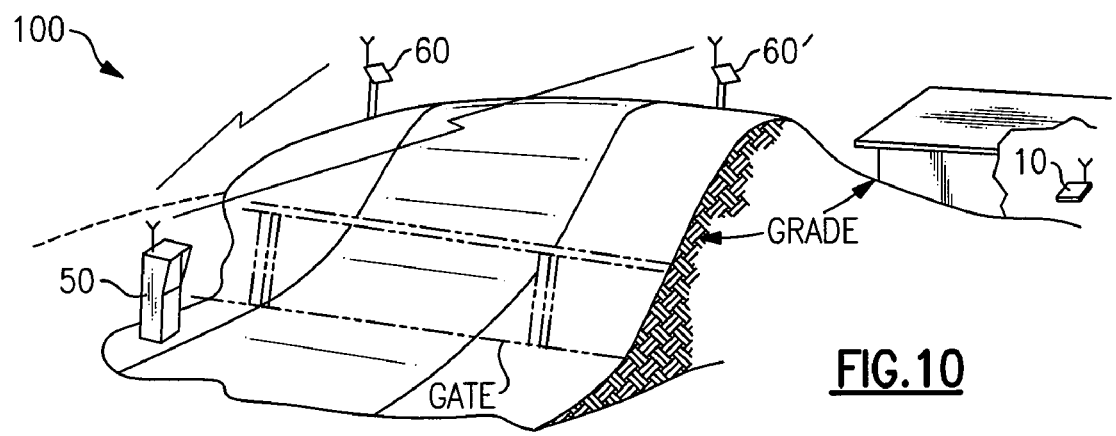
FIG. 10 is a system diagram including a repeater pair in accordance with yet another embodiment of the present invention.

Referring to FIG. 10, security system 100 includes a repeater pair in another embodiment of the present invention. In this embodiment, repeater 60 operates over one wireless channel and repeater 60' operates over another wireless channel. Repeater 60' provides system 100 with redundancy. Gate system 50 is configured to send a single transmission to base station 10 by transmitting the message over the repeater 60 wireless channel and subsequently re-transmitting the identical message via the repeater 60' wireless channel. As in the single repeater embodiment, repeater pair (60, 60') may be cascaded to extend the range of system.

Figure 11:
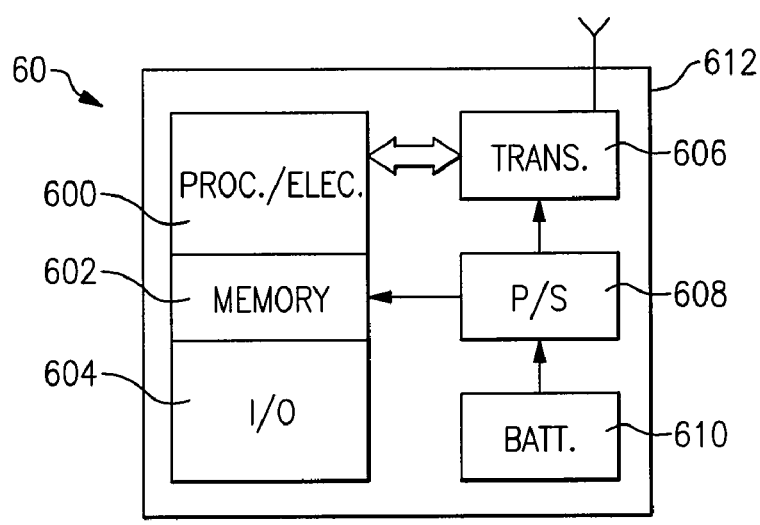
FIG. 11 is a block diagram of one of the repeaters depicted in either FIG. 9 or FIG. 10.

As embodied herein and depicted in FIG. 11, a block diagram of the repeaters depicted in FIG. 9 and FIG. 10 is disclosed.

Repeater 60 includes processor 600, memory 602, I/O circuitry 604, and transceiver circuitry 606 mounted on a printed circuit board and disposed within housing 612. Repeater 60 also includes a power supply 608 that provides the individual components in repeater 60 with power signals having the appropriate voltage levels. Power supply 608 receives power from battery unit 610.

The repeater transceiver 606 is connected to an antenna. Of course, the range of transceiver 606 is a function of the battery capacity. Repeater transceiver 606 is tuned to the pre-selected RF channel upon initialization. Thereafter, gate access system 50 may direct transceiver 606 to an alternate channel based on system 100 requirements. Referring to FIG. 10, for example, repeater 60 may be tuned to a primary wireless channel whereas repeater 60' is tuned to a redundant secondary wireless channel. If gate system 50, or base station 10, determines that a particular repeater frequency is problematic due to interference or some other such occurrence, system 100 is configured to hop between alternate frequencies to restore repeater use and/or redundancy.

As noted previously, with all things being equal, the range of any radio system is typically inversely proportional to the frequency. With that in mind, the power of the RF transmit signal, and the sensitivity of the RF receiver, determines the radius of coverage (See DIM X). The power of the RF signal is also a function of the battery capacity. As noted above, the suite of frequencies and the battery employed by the repeater 60 are selected to ensure that the coverage range (DIM X) is about 1,000 ft.

With this in mind, those of ordinary skill in the art will understand that battery 610 may be of any suitable type depending on the frequency, range, and the dimensional constraints of the repeater itself. In one embodiment, battery 610 may be implemented using a pair of AA Size Lithium batteries. Those of ordinary skill in the art will also recognize that battery 610 may be implemented using nickel-cadmium (NiCd) batteries, nickel-metal hydride (NiMH), lithium-ion, or lithium polymer (Li-Pol) batteries. Battery 610 may also be implemented using a rechargeable battery. This embodiment, of course, may prove to be impractical in some applications. However, this option is available when the situation warrants.

The I/O circuit 604 is coupled to one or more switches and LEDs disposed on the front panel of housing 612. The switches are coupled to the printed circuit board and are used to select the mode of repeater. In particular, the switches provide I/O circuit 604 with a mode select signal that drives processor 600 into a "learn mode" after the gate system 50 is placed in teach mode. The switches may also be used to erase a previously programmed repeater before re-entering the learn mode. One of the switches is also used to designate the repeater as a primary or secondary repeater in the pair system of FIG. 10.

The Teach-Learn process is as follows. If the repeaters 60 and the base station 10 have been previously paired with a gate access system 50, the pairing may be undone using the erase feature on both units. Before continuing, high quality batteries are installed in each repeater 60. As noted previously, lithium AA batteries provide many years of operation. In the next step, gate access system 50 is placed in teach mode and the Call button on the front panel is pressed. The gate system 50 responds to a teach mode command by transmitting a system identification key. The repeater 60 learn switch/button is actuated causing an LED to be illuminated. Within 2-3 seconds the LED should extinguish, indicating that repeater 60 experienced a successful learn. This process is repeated for each repeater 60 employed in system 100. Each repeater 60 receives the teach transmissions in the learn mode and programs itself to employ the system identification key in transmissions between itself, the gate transceiver 50 and the base station 10. Base station 10 also includes a learn mode switch/button and may be programmed in the same manner. Accordingly, transmissions that do not include the system identifier are not recognized by any of the units in system 100 thereafter. When the paired repeater system (See FIG. 10) is employed, the primary/secondary switch is placed in the ON position for the primary repeater unit and put in the OFF position on the secondary repeater unit. At this point the system is operational and the repeaters may be installed at appropriate locations such that system 100 operates consistently. See FIG. 9 and FIG. 10.

As noted above, repeaters 60 may be cascaded to extend the range to a theoretically unlimited distance. In cascading repeaters 60, the repeaters previously paired to the gate access system 50 are, in turn, placed in teach mode, and the second set of repeaters are placed in learn mode in the manner previously described. The primary/secondary switches on the second set of repeaters are also set in the ON/OFF positions as previously described.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A gate access system comprising:
an imaging system configured to capture an image of an object disposed in a field of view of the imaging system in response to an image capture signal, the imaging system also being configured to associate time/date data with the image, the time/date data representing a time and a date when the image was captured;
at least one gate access input device that has a plurality of gate access controls including at least two different types of gate access controls configured to effect access to a same secured area according to different methods, the at least two different types of gate access controls coupled to the imaging system and configured to transmit the image capture signal in response to being actuated; and
a gate transmitter coupled to the imaging system, the transmitter being configured to transmit the image and the time/date data via at least one wireless communication channel.

2. The system of claim 1, wherein the imaging system further comprises:
an image sensor configured to convert the image into electrical signals;
a converter configured to convert the electrical signals into digital imaging data;
a processor system configured to actuate the image sensor, compress the digital imaging data, and assemble the compressed digital imaging data and the time/date data into a packet for transmission over the at least one wireless communication channel.

3. The system of claim 1, wherein the transmitter is a transceiver further comprising a voice intercom system coupled to the transceiver and configured to accommodate two-way voice communications via the at least one wireless communication channel.

4. The system of claim 1, wherein the plurality of gate access controls includes a call button, the call button being configured to generate the image capture signal in response to being actuated by a user.

5. The system of claim 1, wherein the plurality of gate access controls includes a key device configured to generate the image capture signal in response to being actuated by a user.

6. The system of claim 5, wherein the key device includes a key lock.

7. The system of claim 5, wherein the key device includes a data entry keypad device.

8. The system of claim 5, wherein the key device includes a card reader.

9. The system of claim 8, wherein the card reader is an RFID card reader.

10. The system of claim 8, wherein the card reader is a magnetic strip card reader.

11. The system of claim 5, wherein the key device includes a biometric reader device.

12. The system of claim 11, wherein the at least one wireless communication channel includes a plurality of wireless channels.

13. A gate access system comprising:
an imaging system configured to capture an image of an object disposed in a field of view of the imaging system in response to an image capture signal, the imaging system also being configured to associate time/date data with the image, the time/date data representing a time and a date when the image was captured;
at least one gate access input device that has a plurality of gate access controls, individual gate access controls different methods for effecting access, at least two of the gate access controls coupled to the imaging system and configured to transmit the image capture signal in response to being actuated; and
a gate transmitter coupled to the imaging system, the transmitter being configured to transmit the image and the time/date data via at least one wireless communication channel;
wherein the gate transmitter is part of a gate transceiver, the system further comprising:
a processor coupled to the gate transceiver and configured to respond to a teach mode command from at least one of the plurality of gate access controls, whereby a system identification key is transmitted via the at least one wireless communication channel in response to the teach mode command; and
at least one RF repeater including a repeater transceiver and a mode selection element configured to drive the repeater transceiver into a learn mode, whereby the at least one RF repeater is configured to employ the system identification key in transmissions between the gate transceiver and the repeater transceiver.

14. The system of claim 13, wherein the at least one RF repeater is configured to receive transmissions including the system identification key from the gate transmitter and retransmit the transmissions via the at least one wireless communication channel to a third transceiver, and receive transmissions including the system identification key from the third transceiver and retransmit the transmissions via the at least one wireless communication channel to the gate transceiver.

15. The system of claim 14, wherein the at least one RF repeater is disposed within a radius from the gate transmitter and the third transceiver, the radius being a function of the RF power characteristics of the repeater transceiver.

16. The system of claim 14, wherein the at least one RF repeater includes a rechargeable battery.

17. The system of claim 16, wherein the at least one RF repeater comprises a pair of RF repeaters including a first RF repeater and a second RF repeater, the first RF repeater and the second RF repeater being configured to operate over a first wireless channel and a second wireless channel respectively.

18. The system of claim 17, wherein the second wireless channel is redundant relative to the first wireless channel such that the transmissions propagating over the first wireless channel are also propagated over the second wireless channel.

19. The system of claim 14, wherein the at least one RF repeater device includes a plurality of repeater devices.

20. A security system comprising:
a gate access system including,
an imaging system configured to capture an image of a field of view of the imaging system in response to an image capture signal, the imaging system also being configured to generate time/date data representing a time and a date when the image was captured,
at least one gate access input that has a plurality of gate access controls including at least two different types of gate access controls configured to effect access to a same secured area according to different methods, the at least two different types of gate access controls coupled to the imaging system and configured to transmit the image capture signal in response to being actuated; and
a gate system transmitter coupled to the imaging system, the transmitter being configured to transmit the image and the time/date data via at least one wireless communication channel; and
a base station system including,
a base station transceiver configured to receive the image and the time/date data via the at least one wireless communication channel,
a memory system coupled to the base station transceiver and configured to store the time/date data and the image, and
a display system coupled to the memory system and configured to display the image and the time/date data.

21. The system of claim 20, wherein the base station system is coupled to at least one telephone set.

22. The system of claim 21, wherein the base station system further comprises an interface circuit configured to propagate voice telephony signals between the at least one telephone set and a telephony network in a telephonic communications mode and propagate voice intercom signals between the telephone set and the base station transceiver in a gate access system communications mode.

23. The system of claim 22, further comprising a control circuit coupled to the base station transceiver, the control circuit being configured to determine a device operating mode status, the device operating mode status including the telephonic communications mode and a remote system communications mode, a state of the interface circuit being in accordance with the device operating mode status.

24. The system of claim 23, wherein the at least one telephone set is an integral portion of the base station system disposed in a system housing.

25. The system of claim 21, wherein the at least one telephone set includes user entry keys configured to selectively display the image and the time/date data on the display system.

26. The system of claim 20, wherein the memory system is configured to store a plurality of images captured by the imaging system, the memory also being configured to associate time/date data corresponding to each of the plurality of images.

27. The system of claim 20, wherein the memory system includes RAM, ROM, flash memory, a hard drive, at least one CD, magnetic media, optical media, and/or at least one extendible memory card.

28. The system of claim 20, wherein the base station system includes a computer system configured to interconnect a plurality of telephone sets, the computer system being configured to propagate voice telephony signals between each of the plurality of telephone sets and a telephony network in a telephonic communications mode and propagate voice intercom signals between the telephone sets and the base station transceiver in a gate access system communications mode.

29. The system of claim 28, wherein the computer system includes at least one user input device.

30. The system of claim 29, wherein the display system is connected to the computer system, the computer system is configured to selectively display the image and the time/date data on the display system.

31. The system of claim 30, wherein the memory system is an integral portion of the computer system and is further configured to store a plurality of images captured by the imaging system, the memory also being configured to associate time/date data corresponding to each of the plurality of images.

32. The system of claim 20, wherein the imaging system further comprises:
an image sensor configured to convert the image into electrical signals;
a converter configured to convert the electrical signals into digital imaging data;
a processor system configured to actuate the image sensor, compress the digital imaging data, and assemble the compressed digital imaging data and the time/date data into a packet for transmission over the at least one wireless communication channel.

33. The system of claim 20, further comprising a voice intercom system coupled to the gate system transmitter and configured to accommodate two-way voice communications via the at least one wireless communication channel.

34. The system of claim 20, wherein the plurality of gate access controls includes a call button, the call button being configured to generate the image capture signal in response to being actuated by a user.

35. The system of claim 20, wherein the plurality of gate access controls includes a key device configured to generate the image capture signal in response to being actuated by a user.

36. The system of claim 35, wherein the key device includes a key lock.

37. The system of claim 35, wherein the key device includes a data entry keypad device.

38. The system of claim 35, wherein the key device includes a card reader.

39. The system of claim 38, wherein the card reader is an RFID card reader.

40. The system of claim 38, wherein the card reader is a magnetic strip card reader.

41. The system of claim 38, wherein the key device includes a biometric reader.

42. A security system comprising:
a gate access system including,
an imaging system configured to capture an image of a field of view of the imaging system in response to an image capture signal, the imaging system also being configured to generate time/date data representing a time and a date when the image was captured,
at least one gate access input that has a plurality of gate access controls, individual gate access controls providing different methods for effecting access, at least two of the plurality of gate access controls coupled to the imaging system and configured to transmit the image capture signal in response to being actuated; and
a gate system transmitter coupled to the imaging system, the transmitter being configured to transmit the image and the time/date data via at least one wireless communication channel; and
a base station system including,
a base station transceiver configured to receive the image and the time/date data via the at least one wireless communication channel,
a memory system coupled to the base station transceiver and configured to store the time/date data and the image, and
a display system coupled to the memory system and configured to display the image and the time/date data;
a processor coupled to the gate system transmitter and configured to respond to a teach mode command from at least one of the plurality of gate access controls, whereby a system identification key is transmitted via the at least one wireless communication channel in response to the teach mode command; and
at least one RF repeater including a repeater transceiver and a mode selection element configured to drive the repeater transceiver into a learn mode, whereby the at least one RF repeater is configured to employ the system identification key in transmissions between the gate transmitter and the repeater transceiver.

43. The system of claim 42, wherein the at least one RF repeater is configured to receive transmissions including the system identification key from the gate transmitter and retransmit the transmissions via the at least one wireless communication channel to a third transceiver, and receive transmissions including the system identification key from the third transceiver and retransmit the transmissions via the at least one wireless communication channel to the gate transmitter.

44. The system of claim 43, wherein the at least one RF repeater is disposed within a radius from the gate transmitter and the third transceiver, the radius being a function of the RF power characteristics of the repeater transceiver.

45. The system of claim 44, wherein the at least one RF repeater includes a rechargeable battery.

46. The system of claim 44, wherein the at least one repeater device includes a plurality of repeater devices.

47. The system of claim 42, wherein the at least one wireless communication channel includes a plurality of wireless channels.

48. The system of claim 47, wherein the at least one RF repeater comprises a pair of RF repeaters including a first RF repeater and a second RF repeater, the first RF repeater and the second RF repeater being configured to operate over a first wireless channel and a second wireless channel respectively.

49. The system of claim 48, wherein the second wireless channel is redundant relative to the first wireless channel such that the transmissions propagating over the first wireless channel are also propagated over the second wireless channel.

50. A gate access system comprising:
an imaging system configured to capture an image of an object disposed in a field of view of the imaging system in response to an image capture signal, the imaging system also being configured to associate time/date data with the image, the time/date data representing a time and a date when the image was captured;
at least one gate access input device which has a plurality of gate access controls, individual gate access controls providing a different method for effecting access, at least two of the gate access controls coupled to the imaging system and configured to transmit the image capture signal in response to being actuated;

a gate transmitter coupled to the imaging system, the transmitter being configured to transmit the image and the time/date data via at least one wireless communication channel;

a processor coupled to the transmitter and configured to respond to a teach mode command from at least one of the gate access controls, whereby a system identification key is transmitted via the at least one wireless communication channel in response to the teach mode command; and at least one RF repeater including a repeater transceiver and a mode selection element configured to drive the repeater transceiver into a learn mode, whereby the at least one RF repeater is configured to employ the system identification key in transmissions between the gate transmitter and the repeater transceiver.

51. The system of claim 50, wherein the at least one RF repeater is configured to receive transmissions including the system identification key from the gate transmitter and retransmit the transmissions via the at least one wireless communication channel to a third transceiver, and receive transmissions including the system identification key from the third transceiver and retransmit the transmissions via the at least one wireless communication channel to the gate transmitter.

52. The system of claim 51, wherein the at least one RF repeater is disposed within a radius from the gate transmitter and the third transceiver, the radius being a function of the RF power characteristics of the repeater transceiver.

53. The system of claim 51, wherein the at least one RF repeater includes a rechargeable battery.

54. The system of claim 53, wherein the at least one RF repeater comprises a pair of RF repeaters including a first RF repeater and a second RF repeater, the first RF repeater and the second RF repeater being configured to operate over a first wireless channel and a second wireless channel respectively.

55. The system of claim 54, wherein the second wireless channel is redundant relative to the first wireless channel such that the transmissions propagating over the first wireless channel are also propagated over the second wireless channel.

56. The system of claim 51, wherein the at least one RF repeater device includes a plurality of repeater devices.

57. A security system comprising:
a gate access system including,
an imaging system configured to capture an image of a field of view of the imaging system in response to an image capture signal, the imaging system also being configured to generate time/date data representing a time and a date when the image was captured, at least one gate access input device coupled to the imaging system, the at least one gate access input device which has a plurality of gate access controls, individual gate access controls providing a different method for effecting access, at least two of the plurality of gate access controls coupled to the imaging system and configured to transmit the image capture signal in response to being actuated; and a gate system transmitter coupled to the imaging system, the transmitter being configured to transmit the image and the time/date data via at least one wireless communication channel; and a base station system including,
a base station transceiver configured to receive the image and the time/date data via the at least one wireless communication channel, a memory system coupled to the base station transceiver and configured to store the time/date data and the image, and a display system coupled to the memory system and configured to display the image and the time/date data;

a processor coupled to the gate system transmitter and configured to respond to a teach mode command from at least one of the plurality of gate access controls, whereby a system identification key is transmitted via the at least one wireless communication channel in response to the teach mode command; and at least one RF repeater including a repeater transceiver and a mode selection element configured to drive the repeater transceiver into a learn mode, whereby the at least one RF repeater is configured to employ the system identification key in transmissions between the gate transmitter and the repeater transceiver.

58. The system of claim 57, wherein the at least one RF repeater is configured to receive transmissions including the system identification key from the gate transmitter and retransmit the transmissions via the at least one wireless communication channel to a third transceiver, and receive transmissions including the system identification key from the third transceiver and retransmit the transmissions via the at least one wireless communication channel to the gate transmitter.

59. The system of claim 58, wherein the at least one RF repeater is disposed within a radius from the gate transmitter and the third transceiver, the radius being a function of the RF power characteristics of the repeater transceiver.

60. The system of claim 59, wherein the at least one RF repeater includes a rechargeable battery.

61. The system of claim 59, wherein the at least one repeater device includes a plurality of repeater devices.

62. The system of claim 57, wherein the at least one wireless communication channel includes a plurality of wireless channels.

63. The system of claim 62, wherein the at least one RF repeater comprises a pair of RF repeaters including a first RF repeater and a second RF repeater, the first RF repeater and the second RF repeater being configured to operate over a first wireless channel and a second wireless channel respectively.

64. The system of claim 63, wherein the second wireless channel is redundant relative to the first wireless channel such that the transmissions propagating over the first wireless channel are also propagated over the second wireless channel.

* * * * *